US007359428B2

(12) United States Patent
Rovini et al.

(10) Patent No.: US 7,359,428 B2
(45) Date of Patent: Apr. 15, 2008

(54) VDSL TRANSMISSION EMPLOYING MULTI-CODE MULTI CARRIER CDMA MODULATION

(75) Inventors: Massimo Rovini, Pisa (IT); Giovanni Vanini, Bergamo (IT); Luca Fanucci, Montecatini Terme (IT)

(73) Assignee: Consorzio Pisa Ricerche, Pisa (IT)

( * ) Notice: Subject to any disclaimer, the term of this patent is extended or adjusted under 35 U.S.C. 154(b) by 635 days.

(21) Appl. No.: 10/901,976

(22) Filed: Jul. 30, 2004

(65) Prior Publication Data

US 2005/0002441 A1  Jan. 6, 2005

(30) Foreign Application Priority Data

Aug. 21, 2003 (IT) .......................... PI2003A0063

(51) Int. Cl.
 *H04B 1/707* (2006.01)
(52) U.S. Cl. ...................... 375/141; 375/260; 375/261; 375/146; 375/299; 375/347; 370/478; 370/479; 370/480
(58) Field of Classification Search ................ 375/295, 375/146, 298, 299
See application file for complete search history.

(56) References Cited

U.S. PATENT DOCUMENTS

| 5,751,705 | A | * | 5/1998 | Sato ........................... 370/335 |
| 6,163,566 | A | * | 12/2000 | Shiino ......................... 375/143 |
| 7,164,696 | B2 | * | 1/2007 | Sano et al. .................. 370/478 |
| 2004/0141548 | A1 | * | 7/2004 | Shattil ......................... 375/146 |
| 2005/0047514 | A1 | * | 3/2005 | Bolinth et al. .............. 375/261 |
| 2006/0193373 | A1 | * | 8/2006 | Agee et al. .................. 375/141 |

\* cited by examiner

*Primary Examiner*—Chieh M. Fan
*Assistant Examiner*—Siu M Lee
(74) *Attorney, Agent, or Firm*—Dennison, Schultz & MacDonald

(57) ABSTRACT

An improved transmission method for high-rate digital communication on unshielded twisted copper pairs for Very-High Speed Digital Subscriber Loop (VDSL) modems. The new modulation scheme is a Multi Code Multi Carrier Code Division Multiple Access, hereafter named $MC^2$ CDMA. The system takes advantage from both the CDMA modulation and the Multi-Carrier transmission and, in addition, the channel throughput is increased adopting a multi-code approach. The novel scheme encompasses transmitter, channel and receiver loading.

7 Claims, 11 Drawing Sheets

VDSL TRANSMISSION EMPLOYING MULTI-CODE MULTI CARRIER CDMA MODULATION

FIELD OF THE INVENTION

The present invention relates to high-rate digital communication on unshielded twisted copper pairs for Very-High Speed Digital Subscriber Loop (VDSL) modems.

BACKGROUND OF THE INVENTION

In VDSL systems the transmitted signal passes through a selective channel that severely affects the communication quality.

One of the modulation proposed for VDSL is the well-known multi-carrier approach of DMT (Discrete Multi Tone) modulation. In DMT where the available bandwidth is split into many sub-bands (normally 2048 or 4096) identified with a respective typical subcarrier frequency.

An aspect of a multi-carrier approach like DMT is that a selective channel is converted to a flat one, with obvious advantages for the communication. DMT system derives from OFDM modulation (Orthogonal Frequency Division Multiplexing) and is improved with respect to the latter owing to a proper bit-loading algorithm. This algorithm provides that starting from the measurement of the SNR (Signal to Noise Ratio) on each subcarrier, the right number of bits to be sent is derived for each of them. The general assumption of the loading operation is that the higher the SNR, the higher the QAM (Quadrature Amplitude Modulation) order, and as a consequence the higher the number of bit carried, keeping the SER (Symbol Error Rate) level under a certain reference value, typically $10^{-7}$ for xDSL application.

Another modulation approach is CDMA (Code Division Multiple Access), which has a better spreading gain against interference and against "noise", and furthermore eases the system synchronization and robustness against frequency and phase offset or jitter.

A natural join between DMT (OFDM) and CDMA is Multi-Carrier CDMA. There are three possible ways to combine CDMA and multi carrier transmissions schemes:

Multi Carrier (MC) CDMA [4], which spreads the original data stream over different subcarriers using a given spreading code in the so-called frequency domain;

Multi Carrier DS-CDMA [5], which spreads the S/P converted data stream, using a given spreading code in the time domain, satisfying the orthogonality condition;

Multi Tone (MT) CDMA [6], which spreads the data stream in the time domain, but there is partial overlapping between the frequency bands reserved to each branch out of S/P converter after spreading, causing the resulting spectrum not to satisfy the orthogonality condition anymore.

Moreover, a MC CDMA scheme with MMSE (Minimum Mean Square Error) is known [6] providing a 2 path frequency selective slow Rayleigh fading channel.

It must be noted that the above multi-carrier CDMA modulation schemes have not been used for a VDSL application, but only for wireless application, nor their suitability to a wired system has been proposed yet.

The way to join Multi-Carrier transmission like OFDM and DMT and CDMA raises the following general considerations:

on one hand OFDM modulation is robust to frequency-selective fading, but suffers in subcarrier synchronization and is sensitive to frequency offset and nonlinear amplification, which results from the fact that it is composed of many subcarriers with overlapping power spectras and exhibits a non-linear nature in its envelope [4].

On the other hand, CDMA systems are quite robust to frequency offsets and nonlinear distortion.

The combination of OFDM signaling and CDMA scheme lowers the symbol rate on each subcarrier so that a longer symbol duration, in the time or frequency domain, eases the system synchronization [4]

performing timing spreading (MT-CDMA and MC-DS CDMA) calls for extra hardware blocks in order to control and synchronize the despreading operation on the receiver front-end (for instance a code acquisition and tracking loop is necessary).

the use of MC-CDMA avoids the need of extra hardware, except from the de-spreading blocks.

in MC-CDMA the spreading/despreading operation can be easily accomplished in the frequency domain before the IFFT processor on the transmitter side or after the FFT processor on the receiver side.

However, some drawbacks affect the use of MC-CDMA as such in a VDSL modem:

using a code division modulation results in a decreasing of the achievable channel rate, since the number of subcarriers available for transmission is reduced by a factor equal to the spreading gain;

usually a CDMA scheme offers a code division multiple access to a shared resource, and it can also manage heavy Multiple Access Interference (MAI) interference with precision. However, in a VDSL environment the MAI interference is arising from an electromagnetic coupling mechanism among twisted pairs, thus the resulting interference to useful signal (I/S) power ratio is so low before despreading that no remarkable results can be achieved after despreading. In this way, the use of a CDMA to remove the system crosstalk interference (NEXT, FEXT) is inappropriate.

SUMMARY OF THE INVENTION

It is an object of the present invention to provide a high-rate digital communication on unshielded twisted copper pairs for Very-High Speed Digital Subscriber Loop (VDSL) modems, which offers an increased channel throughput with respect to a MC CDMA modulation, reaching a data delivery rate of up to 100 Mbps for short wires to the subscribers.

It is a particular object of the present invention to provide a high-rate digital communication with a modulation scheme MC CDMA in which the number of subcarriers available for transmission is not reduced and the achievable channel rate is unchanged.

It is another particular object of the present invention to provide a high-rate digital communication with a modulation scheme MC CDMA that allows to remove the system crosstalk interference (NEXT, FEXT).

The above objects are achieved with the VDSL transmission method according to the present invention, said transmission being organized according to a plurality of parallel branches as a CDMA modulation, said CDMA modulation being effected for each branch on multiple carriers by spreading an original data stream for that branch over different subcarriers thus obtaining a Multi-Carrier CDMA modulation, wherein said Multi-Carrier CDMA modulation is effected using a plurality of different spreading codes in a frequency domain for each subcarrier.

Preferably, the following steps are provided:
Transmitting
Putting in a binary source (b) data sequence to transmit;
Converting or mapping said source data sequence into an alphabet of complex QAM symbols, said conversion being governed by a predetermined bit-loading table that sets a modulation order;
Parallelizing the QAM symbols according to a plurality (p) of transmission branches (k) each having an own symbol stream ($A_k$), each transmission branch having a different QAM modulation order, each QAM modulation order being constant for each transmission branch;
Further parallelizing each symbol stream into a plurality ($N_u$) of symbol sub-streams ($A_k^{(l)}$),
Spreading according to a plurality of sub-carrier frequencies each symbol sub-stream by means of CDMA codes obtaining transmission contributes ($T_{k,i}^{(l)}$) for each sub-carrier frequency;
For a same Sum of all the transmission contributes obtaining for each branch a transmission sample for each sub-carrier frequency
for each branch carrying out an algebraic sum of said transmission contributes ($T_{k,i}^{(l)}$) obtaining a transmission sample ($T_{k,i}$) referred to that branch and to each subcarrier frequency;
associating each sample ($T_{k,i}$) coming from a branch to a respective transmission carrier frequency ($f_n$) according to a predetermined law;
carrying out a multiple carrier transmission based on a reverse Fourier transform (IFFT) of the samples thus associated;
Receiving
controlling the samples received with a processor that operates according to a direct Fourier transform (FFT);
permuting said samples after the FFT according to a law inverse with respect to that used when transmitting;
despreading the samples with the same CDMA codes used in transmission to obtain an estimation of the number ($N_u$) of the transmitted complex symbols ($A_{ku}$);
seriating the symbols ($Z_k''$) into a flow of symbols ($Z_k$) associated to each transmission branch (k).
Further seriating the symbols ($Z_k$) into a flow (Z);
reverse converting or Demapping
estimating the transmitted bits (b)
Preferably, said plurality ($N_u$) of symbol sub-streams ($A_k^{(l)}$) is in variable number according to a predetermined law.

Advantageously, said CDMA codes are orthogonal signature codes (Walsh-Hadamard).

In a first embodiment, said association of each sample ($T_{k,i}$) coming from a branch to a respective transmission carrier frequency ($f_n$) is carried out in an interlaced way.

In an alternative exemplary embodiment, said association of each sample ($T_{k,i}$) coming from a branch to a respective transmission carrier frequency ($f_n$) is carried out as a consecutive not interlaced transmission.

Preferably, for each transmission branch a frequential equalisation is provided according to a determined channel frequency response, compensating the distortions of said channel.

Advantageously, said frequential equalisation is carried out according to a technique selected from the group: Orthogonal Restoring Combining (ORC), Maximum Ratio Combining (MRC), Equal Gain Combining (EGC) and Minimum Mean Square Error (MMSE).

BRIEF DESCRIPTION OF THE DRAWINGS

Further characteristics and advantages of the VDSL transmission method according to the present invention will be made clearer with the following exemplifying description of some embodiments, but not limitative, with reference to the attached drawings, wherein.

DESCRIPTION OF PREFERRED EMBODIMENTS

Figure 1:
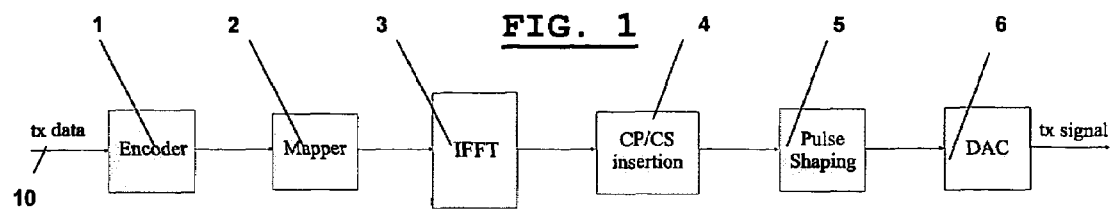
FIG. 1 is a VDSL modem simplified block diagram.

As shown in FIG. 1 in a known VDSL modem after the steps of coding 1 and mapping 2, the source data stream (tx data) enters an IFFT processor 3, which digitally performs multi-carrier modulation. Then, a Cyclic Suffix (CS) and Cyclic Prefix (CP) are added in step 4 and pulse shaping 5 is performed digitally before Digital to Analog conversion 6 that stest up the tx signal.

The received signal (rx signal) then, undergoes a reverse conversion in 16 and, after windowing in 15 and CS/CP removal in 14, the FFT processor 13 recovers the transmitted QAM symbols (Quadrature Amplitude Modulation). Finally, demapping 12 and decoding 11 output the receiver data stream (rx data).

In order to ease the following description of the $MC^2$-CDMA modulation method according to the invention, it is useful to introduce a frequency model of the transmission system. As known [8] under a frequency point of view, a multi-carrier system (DMT, OFDM) is equivalent to $N_c$ QAM modulations performed in parallel where $N_c$ represents the number of system sub-carriers. This way, the IFFT/FFT processor and the timing processing blocks can be neglected, as well as the encoding/decoding are, which are beyond the aims of this invention.

To describe the $MC^2$-CDMA system, the following parameters are introduced:

$N_c$ Number of system sub-carriers.
$G_p$ Processing gain factor.
$P=N_c/G_p$ Number of transmission branches.
$c^{(k)}=[c_0^{(k)} \, c_1^{(k)} \ldots c_{G_p-1}^{(k)}]^T$ Signature code k-, $0 \leq k \leq G_p$.
$X_{k,i}^{(u)}$ Frequency sample of signal x, relating to user u, on branch k and the chip i.

$MC^2$-CDMA Transmitter

Figure 2:
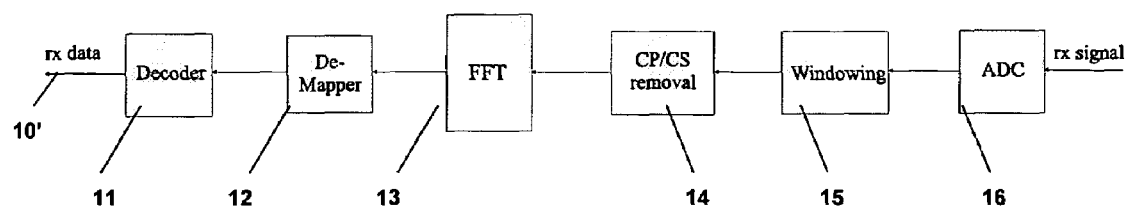
FIG. 2 is a block diagram of a Transmitter Mapping and data parallelization, showing an information bit-stream coming from a certain binary source.
Figure 2:
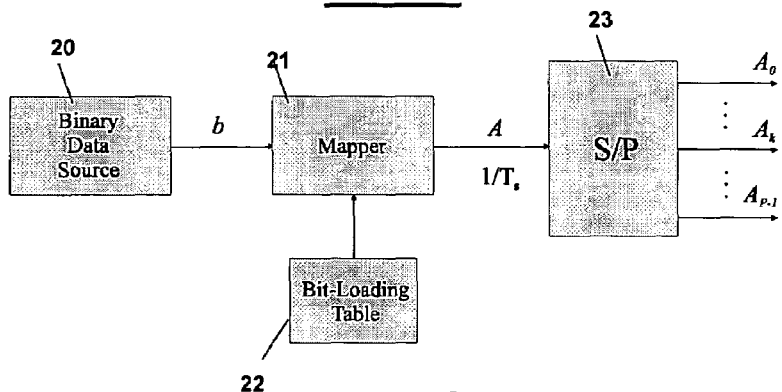

FIG. 2 represents the information bit-stream coming from a certain binary source 20. For the sake of simplicity, no coding and interleaving are considered here. A Mapper 21 translates consecutive (and variable in length) blocks of bits b into the QAM (Quadrature Amplitude Modulation) symbol stream A, influenced by a bit-loading table 22 where the QAM order of each branch is stored. Finally, in S/P block 23 a parallelization is made into $P=N_c/G_p$ transmission branches, each having symbol $A_k$, with k in the range $0 \div P-1$.

Figure 3:
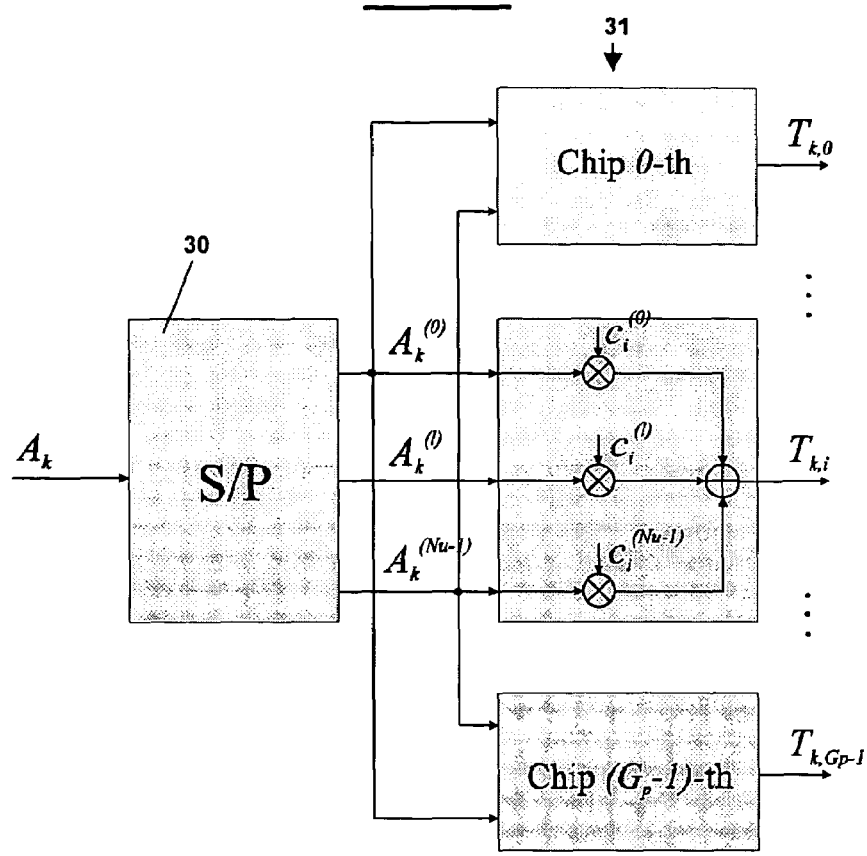
FIG. 3 is a block diagram of a $MC^2$-CDMA branch transmitter.

Each symbol $A_k$ then enters the $MC^2$-CDMA branch transmitter depicted in FIG. 3. Here a further parallelization of each symbol stream $A_k$ into $N_u$ sub-stream symbols $A_k^{(l)}$, $l=0, 1, \ldots, N_u-1$, is performed in block 30, where $N_u$ is the number of signature codes used for transmission. QAM symbols $A_k^{(l)}$ are then used to build in chips 31 the Multi-Code Multi-Carrier CDMA signal $T_{k,i}$, which according to FIG. 3, can be derived as:

$$T_{k,i} = \sum_{l=0}^{N_u-1} T_{k,i}^{(l)} = \sum_{l=0}^{N_u-1} A_k^{(l)} \cdot c_i^{(l)} \quad \text{Eq. 1}$$

$T_{k,i}$ is the transmitted sample in the frequency domain (before IFFT 3 of FIG. 1) related to branch k- and chip i. According to Eq. 1 $T_{k,i}$ is derived as the sum of samples $T_{k,i}^{(l)}$, which are the terms related to the signature code 1, $T_{k,i}^{(l)}=A_k^{(l)} \cdot c_i^{(l)}$.

As far as the signal spectrum is concerned, there are several ways to relate the transmitted samples $T_{k,i}$ to the VDSL sub-carriers, namely all the possible permutations on $N_c$ items, where $N_c$ is the number of system sub-carriers. This is because the frequency sample $T_{k,i}$, $k=0, 1, \ldots, P-1$ $i=0, 1, \ldots, G_p-1$ can be rearranged according to any strategy before they enter the IFFT processor 3 of FIG. 1.

Figure 4:
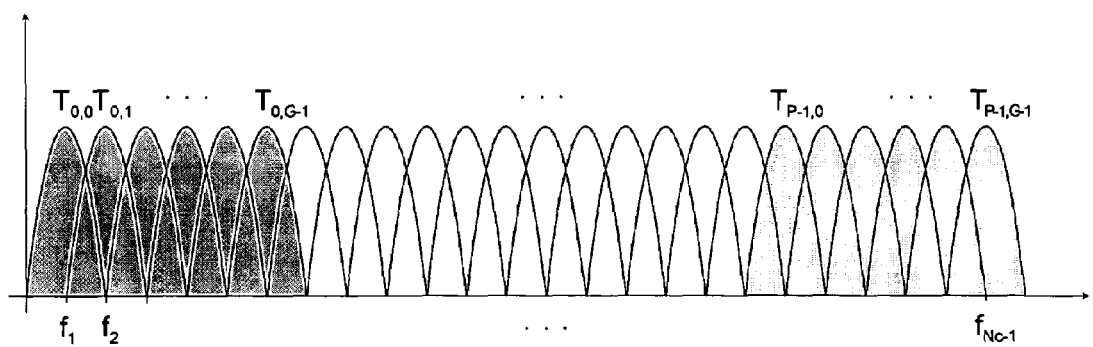
FIG. 4 is a $MC^2$-CDMA not-interlaced signal spectrum.

As shown in FIG. 4, this result can be achieved by spreading samples on consecutive frequencies. In other words, the chips 31 belonging to the same branch are kept close in the frequency available band, which yields a twofold result: on one hand the channel is almost flat on each branch, resulting in low signal distortion; on the other hand the strong channel attenuation at high frequency turns out in bad system performance, that means that a few bits or no bits are loaded on high frequency branches. FIG. 4 shows the transmitted spectrum for such a consecutive, not-interlaced transmission.

Figure 5:
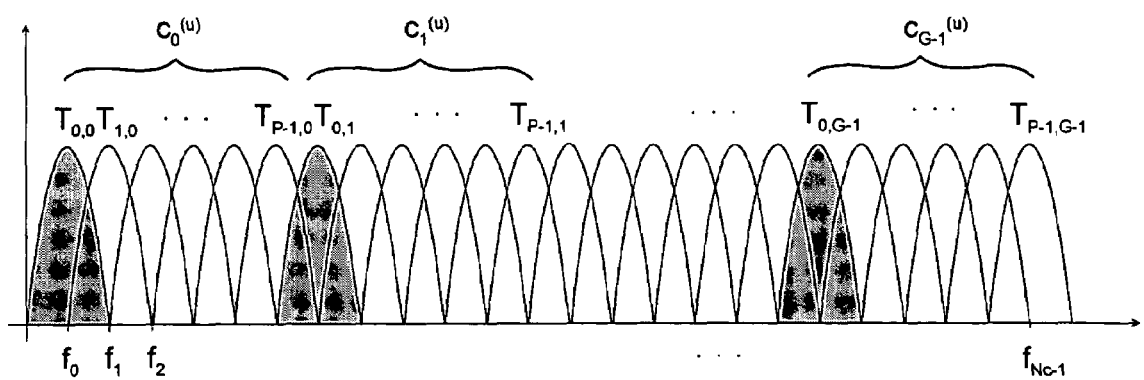
FIG. 5 is a $MC^2$-CDMA interlaced signal spectrum.

As mentioned above, in opposition to a consecutive transmission, the branch chips can be transmitted after some interleaving, in an interlaced manner. A preferred interlaced transmission provides that the branch samples $T_{k,i}$ are equally spread in the frequency domain, as shown in FIG. 5. This way, each transmission branch has a similar set of complex channel coefficients, which results in similar performance, but as a drawback the channel transfer function is not flatter on each branch, which implies a certain increasing in the signal distortion.

Channel

Figure 6:
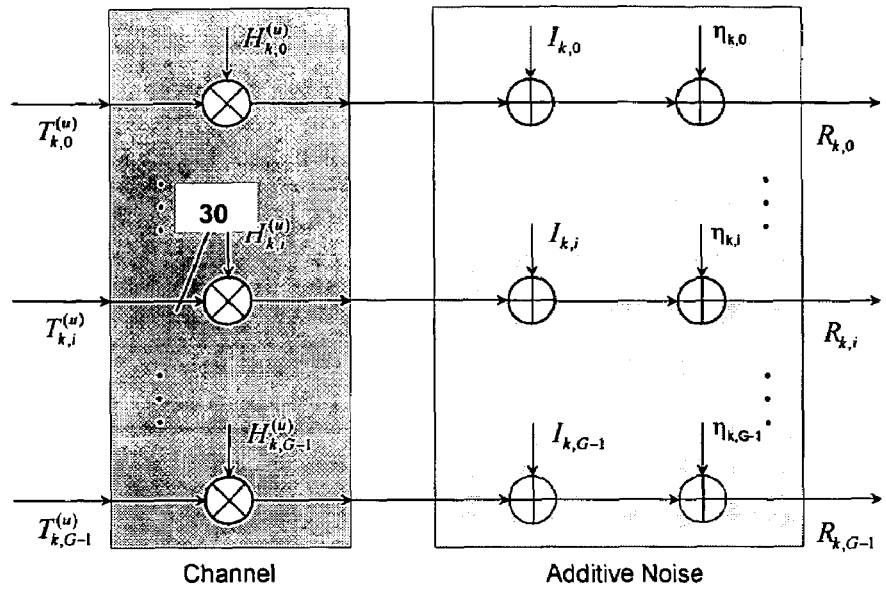
FIG. 6 is a block diagram of a VDSL branch channel.

FIG. 6 shows the frequency model for a typical VDSL transmission channel, described as a frequency selective stationary ISI-free channel, with complex coefficients $H_{k,i}$, $k=0, \ldots, P-1$ $i=0, \ldots, G_p-1$ for the k-th branch at the i-th sub-carrier (or chip). This channel modeling applies whenever the number of used subcarriers $N_c$ is sufficiently large so that it can be considered invariant, both in phase and amplitude, on each sub-carrier [8].

The main noise sources of a VDSL communication are thermal noise (represented with $\eta_{k,i}$ in FIG. 6), Alien Interference, FEXT (Near End Crosstalk) and NEXT (Far End Crosstalk) interferences [1] [2] [8]. The latter is neglected in the overall interference term $I_{k,i}$ of branch k and chip i (added at the receiver on each subcarrier in our frequency modeling), because an ideal modem synchronization and a proper duplexing method are assumed [1].

$MC^2$-CDMA Receiver

Detectors for CDMA systems can be grouped into two basic categories: single-user detectors (SUD) and multi-user detectors (MUD) [7], [9]. In the following example single-user detection schemes are used.

The received signal, derived from FIG. 6, is expressed by:

$$R_{k,i} = H_{k,i} \cdot \sum_{l=0}^{N_u-1} T_{k,i}^{(l)} + I_{k,i} + \eta_{k,i} \quad \text{Eq. 2}$$

Figure 7:
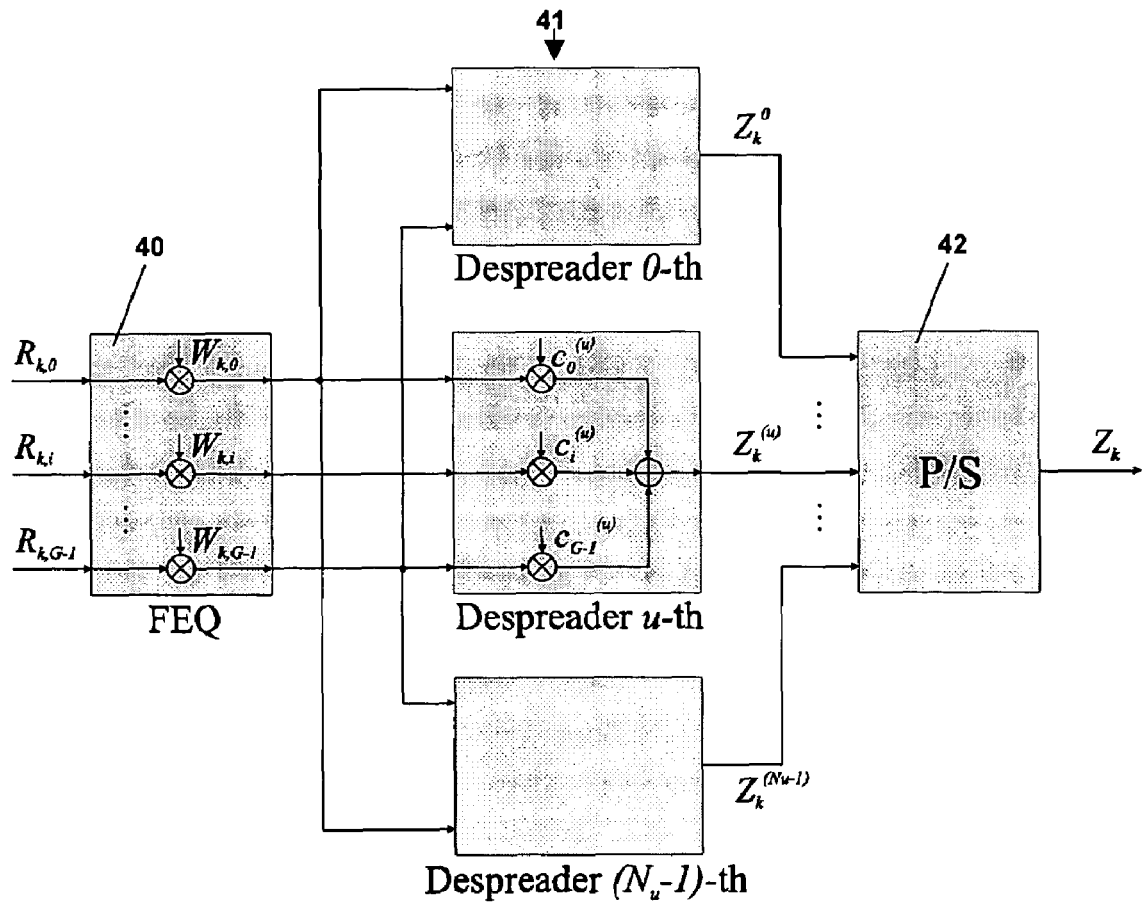
FIG. 7 is a block diagram of a $MC^2$-CDMA branch receiver.
Figure 8:
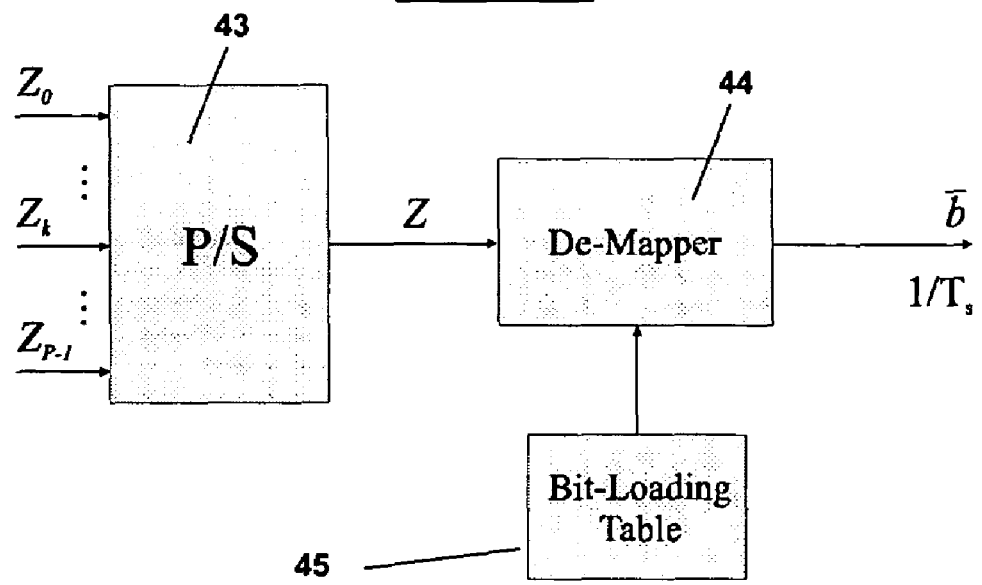
FIG. 8 is a block diagram of a $MC^2$-CDMA demapper.

FIGS. 7 and 8 shows the frequency model of the $MC^2$-CDMA receiver.

In particular, FIG. 7 shows the frequency model of the receiver branch k. The received samples $R_{k,i}$ (in the frequency domain, after FFT) on branch k undergo channel equalization, performed here in the frequency domain by means of a Frequency Equalizer (FEQ) filter 40, which just multiplies them by the complex coefficients $W_{k,i}$, chosen according to a certain equalization technique. Then, the equalized samples enter $N_u$ despreaders 41, each of whom just correlates the received samples with the related signature code $c_i^{(l)}$, ticking index l in the range $0, 1, \ldots N_u-1$. Finally, a first P/S converter 42 ($N_u$ to 1) recovers the transmitted QAM symbol stream $Z_k$ on branch k. A second P/S converter 43 (P to 1), shown in FIG. 8, recovers the transmitted QAM symbol stream Z which is eventually passed to the hard detector 44 (de-mapper). The latter, according to the bit-loading table 45, outputs the eestimationte $\bar{b}$ of the transmitted bit stream b.

Developing from Eq. 2, the decision variable at the hard detector coming from the $u^{th}$ despreader can be split in three parts:

$$Z_k^{(u)} = S_k^{(u)} + M_k^{(u)} + N_k, \quad \text{Eq. 3}$$

where, $$S_k^{(u)} = \sum_{i=0}^{G_p-1} (c_i^{(u)})^* \cdot W_{k,i} \cdot H_{k,i} \cdot T_{k,i}^{(u)}$$

$$= \sum_{i=0}^{G_p-1} (c_i^{(u)})^* \cdot W_{k,i} \cdot H_{k,i} \cdot A_k^{(u)} \cdot c_i^{(u)} \quad \text{Eq. 4}$$

is the useful signal component at the hard detector input.

Term $M_k^{(u)}$ in Eq. 3 denotes the self-MUI coming from the other signatures, arising when demodulating the $u^{th}$ signature code. That means:

$$M_k^{(u)} = \sum_{i=0}^{G_p-1} (c_i^{(u)})^* \cdot W_{k,i} \cdot H_{k,i} \cdot \left[ \sum_{l=0, l \neq u}^{N_u-1} T_{k,i}^{(l)} \right]$$

$$= \sum_{i=0}^{G_p-1} (c_i^{(u)})^* \cdot W_{k,i} \cdot H_{k,i} \cdot \left[ \sum_{l=0, l \neq u}^{N_u-1} A_k^{(l)} \cdot c_i^{(l)} \right] \quad \text{Eq. 5}$$

Finally, the noise term $N_k$ in Eq. 3 includes all the noise sources (thermal noise and crosstalk interference) after equalization and despreading:

$$N_k = \sum_{i=0}^{G_p-1} c_i \cdot W_{k,i} \cdot (\eta_{k,i} + I_{k,i}) \quad \text{Eq. 6}$$

In frequency equalization filter (FEQ) 40 of FIG. 7 the following combining techniques may be implemented: Orthogonal Restoring Combining (ORC), Maximum Ratio Combining (MRC), Equal Gain Combining (EGC) and Minimum Mean Square Error (MMSE) [9]-[13]. They are summarized in Tab. 1, where the expression of the related branch equalization coefficients $W_{k,i}$ are given:

| FEQ type | Branch Coefficients |
|---|---|
| ORC | $W_{k,i} = \dfrac{1}{H_{k,i}}$ |
| MRC | $W_{k,i} = H_{k,i}^*$ |
| ECG | $W_{k,i} = \dfrac{H_{k,i}^*}{|H_{k,i}|}$ |
| MMSE | $W_{k,i} = \dfrac{H_{k,i}^*}{N_c |H_{k,i}|^2 + \gamma}$ |

In the coefficients for MMSE, the parameter $\gamma = \sigma^2/E_S$ is the ratio between the overall received noise and the energy of the transmitted signal. Note that MMSE equalization does not imply any matrix product, but a simpler linear equalization. This approach properly applies to a full-load transmission, when $N_u = G_p$ signature codes are used. Otherwise, when this condition is not met, MMSE equalization ends in a multiplication by a block-wise diagonal matrix, whose main blocks computation requires a matrix inversion, resulting in strong computational burden [10].

Bit-Loading Algorithm

The main feature of a DMT transmission that distinguishes it from an usual multi carrier modulation such as OFDM, is the necessity of a bit-loading algorithm [8]. This means that the QAM modulation order of (or equivalently the number of bits to be loaded on) each sub-carrier or branch has to be derived according to a certain strategy. On the contrary, using the same QAM modulation order on each branch would severely affect the whole transmission because of the great attenuation on high frequency branches.

The overall achievable channel rate C can be expressed as the sum of the branch rate $C_k$ which is due to $N_u$ codes, each of them bearing $b_k$ bits:

$$C = \frac{1}{T} \sum_{k=0}^{P-1} N_u \cdot b_k = \sum_{k=0}^{P-1} C_k. \quad \text{Eq. 7}$$

In Eq. 7 T=250 μs is the VDSL symbol time period, comprehensive of cyclic suffix (CS) and cyclic prefix (CP), and $$b_k = \lfloor \log_2(M_k) \rfloor = \left\lfloor \log_2\left(1 + \frac{SNR_k}{\Gamma}\right) \right\rfloor, \quad \text{Eq. 8}$$

being $\lfloor x \rfloor$ the greater integer smallest than x, $M_k$ the QAM order (number of constellation points) at the $k$-$^{th}$ branch, $SNR_k$ the Signal to Noise Ratio of the decision variable on the same branch, and finally $\Gamma$ the so-called SNR gap (or normalized SNR), defined as:

$$\Gamma = \frac{1}{3}\left(\frac{d_{min}}{2\sigma}\right)^2. \quad \text{Eq. 9}$$

The starting point to derive Eq. 9 is the (two-dimensional) symbol error probability (SER) [8], closely up-bounded by $$P_e \leq 4Q\left(\frac{d_{min}}{2\sigma}\right),$$

where Q is the well-known Q-function, $d_{min}$ is the minimum distance between QAM received symbols at the channel output, $d_{min}^2 = d^2 |H_k|^2$, and d is the distance between the symbols of the transmitted QAM constellation. Typically, a DSL application should assure a symbol error rate per dimension of $10^{-7}$, which yields:

$$\left(\frac{d_{min}}{2\sigma}\right)^2_{dB} = 14.5 \text{ dB} + \gamma_m - \gamma_c, \quad \text{Eq. 10}$$

where $\gamma_m$ is the SNR margin (dB) and $\gamma_c$ is the code gain (dB).

Equations 4, 5 and 6 can be used to derive the Signal to Noise Ratio (SNR) at the receiver branch k, after preliminary rearrangements in terms of signal energy. Thus, Eq. 4 can be regarded as:

$$S_k^{(u)} = \sum_{i=0}^{G_p-1} |c_i^{(u)}|^2 \cdot W_{k,i} \cdot H_{k,i} \cdot A_k^{(u)} = D_k^{(u)} \cdot A_k^{(u)} \qquad \text{Eq. 11}$$

having defined $$D_k^{(u)} = \sum_{i=0}^{G_p-1} |c_i^{(u)}|^2 \cdot W_{k,i} \cdot H_{k,i} = \sum_{i=0}^{G_p-1} W_{k,i} \cdot H_{k,i}$$

for antipodal binary codes (±1). This way, the received energy per branch at the hard detector input turns out to be:

$$E_k^{(u)} = E\{|Z_k^{(u)}|^2\} = |D_k^{(u)}|^2 \cdot E_s^{(u)}, \qquad \text{Eq. 12}$$

where $E_s^{(u)}$ is the transmitted symbol energy at every branch of the u-th reference code. ($E_s^{(u)} = E_s/N_u$ and $E_s = -60$ dBm/Hz as standardized for a VDSL transmission [14]).

In the same way Eq. 5, yields:

$$M_k^{(u)} = \sum_{l=0, l \neq u}^{N_c-1} A_k^{(l)} \cdot \sum_{i=0}^{G_p-1} W_{k,i} \cdot H_{k,i} \cdot (c_i^{(u)})^* \cdot c_i^{(l)} = \sum_{l=0, l \neq u}^{N_c-1} A_k^{(l)} \cdot \Delta_k^{(l,u)}, \qquad \text{Eq. 13}$$

where $$\Delta_k^{(l,u)} = \sum_{i=0}^{G_p-1} W_{k,i} \cdot H_{k,i} \cdot (c_i^{(u)})^* \cdot c_i^{(l)} \qquad \text{Eq. 14}$$

represents the cross-correlation term between the reference code u and the generic l-th interferer on branch k. This way, the MUI interference affects the $SNR_k$ at the hard detector input with the noise power $$E_M^{(u)} = \left| \sum_{l=0, l \neq u}^{G-1} A_k^{(l)} \cdot \Delta_k^{(l,u)} \right|^2.$$

It is important to point out that even dealing with orthogonal codes like the WH ones, depending from the respective FEQ type, the self-MUI interference is not generally zero. The only case when it does happen relates to ORC equalization, where $W_{k,i} \cdot H_{k,i} = 1$ and $$\Delta_k^{(l,u)} = \sum_{i=0}^{G_p-1} (c_i^{(u)})^* \cdot c_i^{(l)} = G_p \cdot \delta_{u,l}$$

is equal to $G_p$ just in the case of u=l.

As far as the noise power is concerned, Eq. 6 yields:

$$\sigma_{N_k}^2 = E\{|N_k|^2\} = \sum_{i=0}^{G_p-1} |c_i|^2 \cdot |W_{k,i}|^2 \cdot [E\{|\eta_{k,i}|^2\} + E\{|I_{k,i}|^2\}] = \qquad \text{Eq. 15}$$

$$\sum_{i=0}^{G_p-1} |c_i|^2 \cdot |W_{k,i}|^2 \cdot [\sigma_{w,k}^2 + \sigma_{I,k}^2] = \sum_{i=0}^{G_p-1} |c_i|^2 \cdot |W_{k,i}|^2 \cdot \sigma_k^2,$$

where $\sigma_{w,k}^2 = E\{\eta_{k,i}^2\}$ is the power spectral density of the input noise (−140 dBm/Hz for a typical VDSL application) and $\sigma_{I,k}^2$ is that of the interference noise on branch k. Finally, we can rearrange Eq. 15 in the form:

$$\sigma_{N_k}^2 = F_k \cdot \sigma_k^2, \qquad \text{Eq. 16}$$

where the coefficient $F_k$ has been defined as:

$$F_k = \sum_{i=0}^{G_p-1} |c_i|^2 \cdot |W_{k,i}|^2. \qquad \text{Eq. 17}$$

In conclusion, merging Eqs. 12, 13 and 16, we can easily derive the signal to noise ratio at the input of the hard detector on branch k for the $u^{th}$ reference code as:

$$SNR_k^{(u)} = \frac{E_k^{(u)}}{\sigma_{N_k}^2 + E_M^{(u)}} = \frac{|D_k|^2 \cdot E_s^{(u)}}{F_k \cdot \sigma_k^2 + E_M^{(u)}} \qquad \text{Eq. 18}$$

Eq. 18 applies to the detection of the reference code $c^{(u)}$, and used in Eq. 8 gives the number of bits to be loaded on every VDSL symbol (bit-loading). Note that it depends from the type of equalization performed on the receiver. This turns out in different channel capacity considering different FEQs on the receiver side.

Simulated Results

This section shows the results carried out exploiting the MC²-CDMA modulation scheme presented above, and the bit-loading algorithm strategy derived in Section 5.1.5.

If not differently specified, all the presented results have been derived under the following assumptions:

- The channel type is ANSI TP2, with diameter of 0.5 mm (or 24 AWG) and the system exploits $N_c = 4096$ sub-carriers, whose spacing is set to 4312.5 Hz;
- A VDSL full duplex (aggregated, upstream plus downstream) frequency planning has been considered, featuring an occupation bandwidth from 138 KHz (lower bound) to 12 MHz (upper bound), excluding some reserved HAM bands as stated in [14];
- The transmitted signal spectral power density level is −60 dBm/Hz, also according to [14];
- The background thermal noise power spectral density is set to −140 dBm/Hz;
- The QAM constellation order has been limited to 14 bits per symbol, that seems reasonable taking into account VLSI implementation issues;
- No SNR margin nor code gain ($\gamma_m = \gamma_c = 0$ dB) has been considered;
- Alien and FEXT interference comply with the ETSI standard [14]. The latter exhibits a spectral density shaped as according to:

$$P_{FEXT}(f,d) = P_s(f) K_F f^2 d |H(f,d)|^2 (N/49)^{0.6}, \qquad \text{Eq. 19}$$

where $P_s(f)$ is power spectral density of the transmitted signal, $K_F=3.27 \cdot 10^{-18}$ is a constant parameter [14], d is the coupling length, $H(f, d)$ is the channel transfer function of the considered wire, and N is the number of interferes.

The first result is that in case of interlaced and true multi-code transmission ($N_u>1$), no bit loading is possible and the overall resulting capacity is zero. This is because in an interlaced transmission, the branch transfer function yields heavy signal distortion, both in amplitude and phase. As a consequence, the signature codes orthogonality is corrupted, and a great residual power of self-MUI is experienced after despreading. Thus, we will consider hereafter a not-interlaced transmission.

Figure 9:
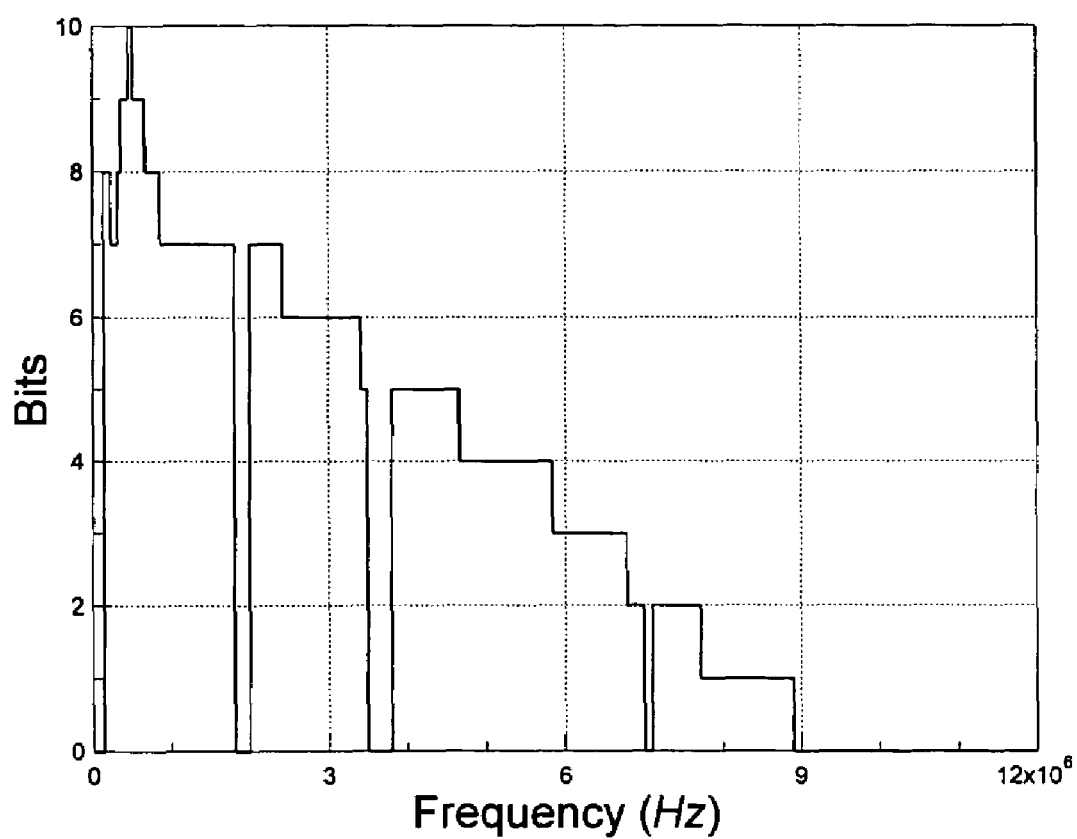
FIG. 9 is a Bit loading profile for a standard DMT transmission (Gp=1) in presence of Alien and 15 FEXT interferers.

FIG. 9 shows the bit-loading profile of a typical DMT transmission ($G_p=N_u=1$) in presence of Alien and 15 FEXT interferers. The cable is ANSI TP2 with length 1.1 Km. Note that no loading is performed below the start frequency of 138 KHz, inside the reserved HAM bands (three bands are highlighted in FIG. 6) and roughly beyond 9 MHz. The last result is due to the considered transmission conditions. Applying Eq. 7 to the profile sketched in figure, the relevant channel rate turns out to be 33.99 Mbps, which means that 8498 bit are sent per DMT symbol.

Figure 10:
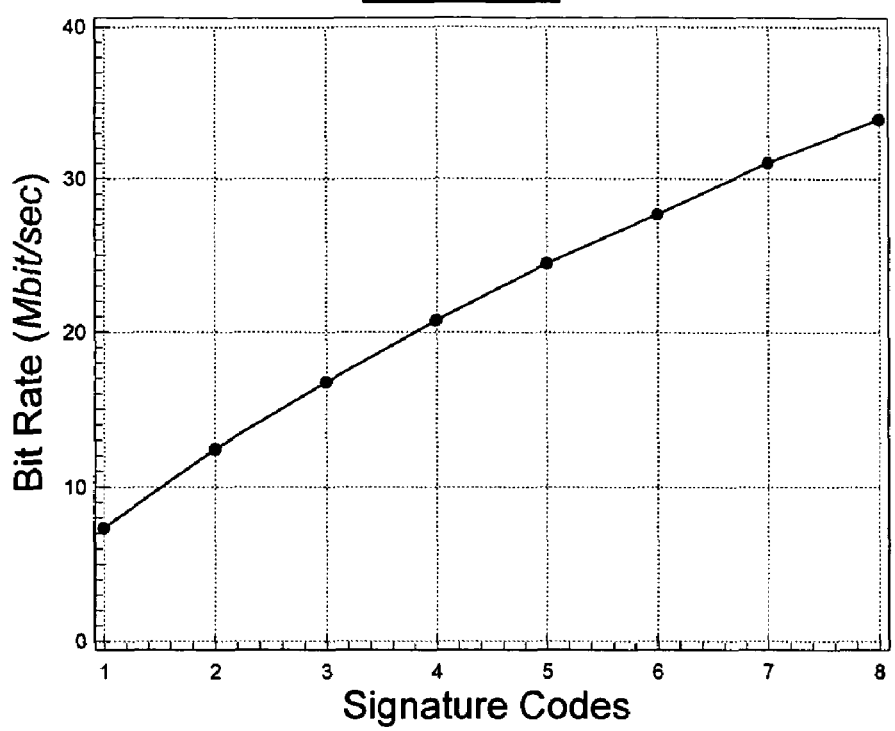
FIG. 10 is an overall channel capacity diagram for an ORC receiver as a function of the number of transmission codes Nu. (1.1 Km-long ANSI TP2 wire, 15 FEXT interferers and Alien, not-interlaced transmission)

FIG. 10 shows the simulated channel rate for the ORC receiver and $G_p=8$ as a function of the number $N_u$ of signature codes. We can notice a nearly linear relationship between channel capacity and number of used codes, which suggest to use the maximum number of codes for transmission. In the following we will assume $N_u=G_p$ in order to maximize the channel rate and this situation will be referred as full MC²-CDMA. However, a deeper sight reveals a slight decreasing in the function slope. On the one hand ORC equalization completely recovers the orthogonality among users codes destroyed by the channel, and no residual MUI is experienced on the decision variable. On the other, the higher the number of used codes, the lower the transmission energy per code and consequently the $SNR_k$ at the branch detector input, resulting in a lower number of bits allocated on each branch than expected with a linear low. The case $N_u=1$ relates to a standard MC-CDMA transmission, where no multi-code is adopted. As foreseen in Section 4, the adoption of a MC-CDMA modulation scheme yields worse performance than a standard DMT transmission (7.364 Mbps when $G_p=8$ compared with 33.984 Mbps).

Figure 11:
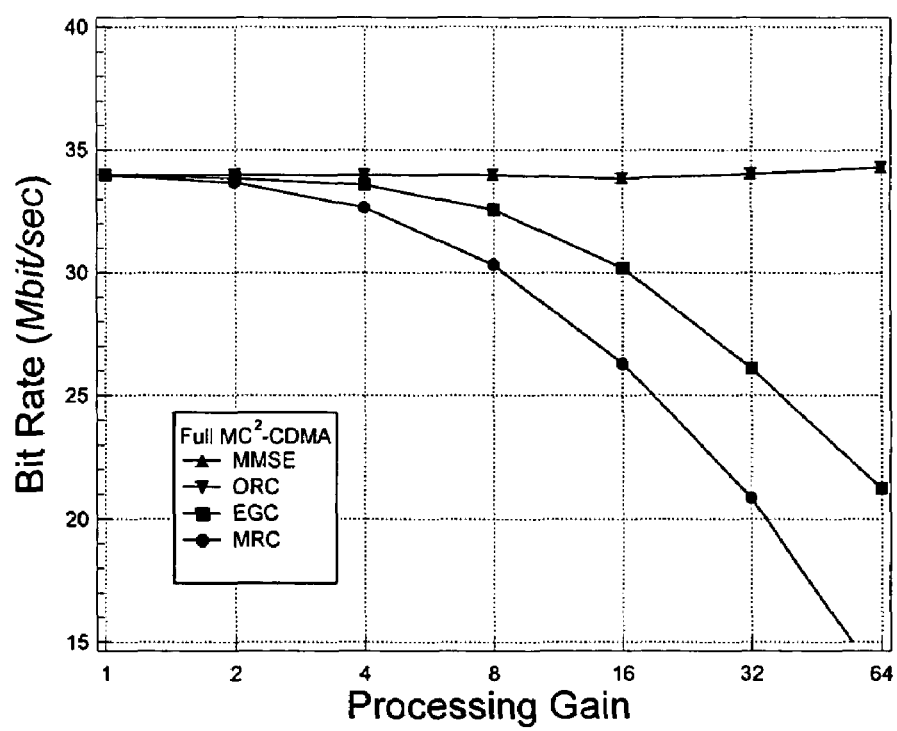
FIG. 11 is a channel rate vs. processing gain diagram with full $MC^2$-CDMA (1.1 Km-long ANSI TP2 wire, 15 FEXT interferers and Alien, not-interlaced transmission)

The simulated channel rate is also plotted as a function of the code gain (ranging in [1-64]) for different equalization techniques in FIG. 11. Here, the case $G_p=1$ refers to the standard DMT transmission. We can see that ORC as well as MMSE outperforms the other combining techniques, and that they yield a channel rate independent of the processing gain itself. Usually MMSE assures better performance than ORC [4]-[6], because it avoids the noise amplification on the weak sub-carriers, as happens with ORC instead. On the other hand MMSE does not maintain the signature codes orthogonality, which is the main issue in a multi-code environment, and the term $E_M^{(u)}$ in Eq. 18 is not zero as for ORC. As a result, MMSE and ORC perform almost the same. However, from a system complexity point of view, the latter results in a simpler implementation, thus it is preferable to the former.

Figure 12:
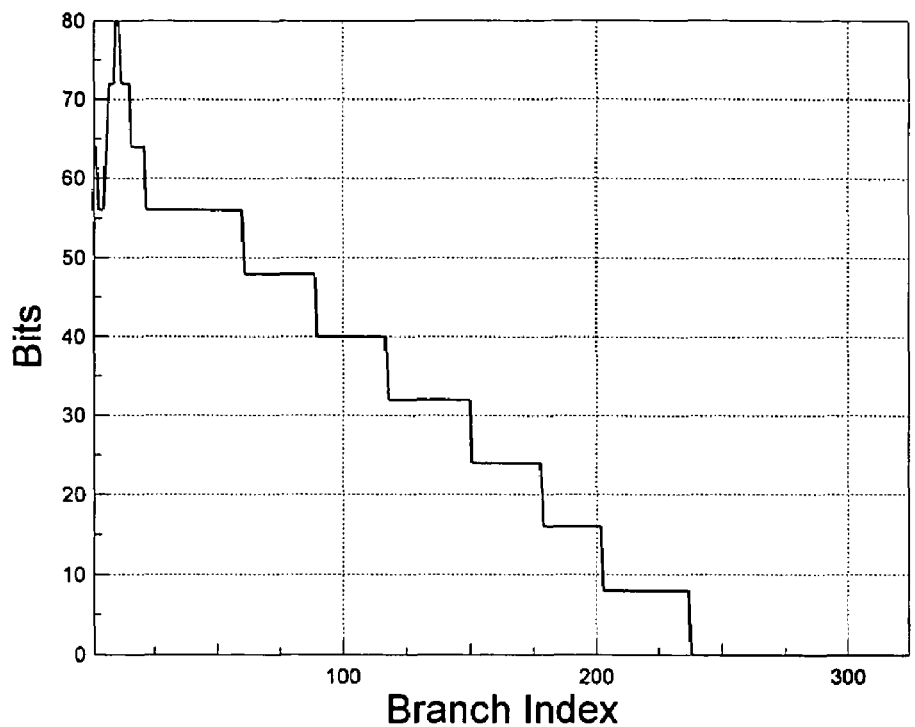
FIG. 12 is a bit loading profile for a full $MC^2$-CDMA transmission (Gp=Nu=8) in presence of Alien and 15 FEXT interferers.

Finally, FIG. 12 reports the simulated loading profile for a full MC²-CDMA system, in presence of Alien and 15 FEXT interferers as usual. The wire is 1.1 Km-long, type ANSI TP2. Here the total number of bits transmitted on a each branch (given by the product of the QAM modulation order and the number of used signature codes), assuming $N_u=G_p$ active codes per transmission, is plotted against the branch index. The branches have been numbered consecutively, and for instance the first branch lies from the frequency 138 KHz up to 138+8*4,3125=172,5 KHz. Note that branch index 320 corresponds roughly to 320·8·4,3125 KHz≅12 MHz.

Figure 13:
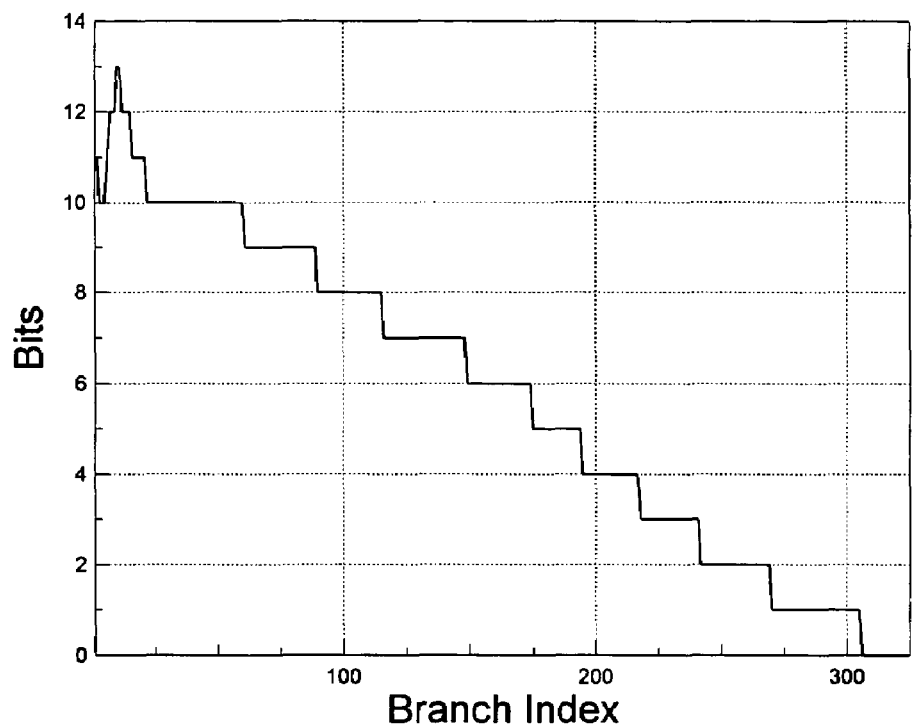
FIG. 13 is a bit loading profile for a MC-CDMA transmission (Gp=8, Nu=1) in presence of Alien and 15 FEXT interferers.

For the sake of comparison, FIG. 13 reports the bit-loading profile in the same condition as FIG. 8, relating to a MC-CDMA modulation scheme with $G_p=8$. The overall channel rate is 7.364 Mbps.

System Optimization

Once the suitability of the MC²-CDMA modulation in association with ORC has been demonstrated (see Section 5.1.6) we further want to optimize it in terms of number of transmitted code per branch. That is, Eq. 1 can be rearranged adopting a variable number of signature codes on each branch, i.e. $N_u=N_u(k)$. This way the transmitted samples can be expressed as $$T_{k,i} = \sum_{l=0}^{N_u(k)-1} T_{k,i}^{(l)} = \sum_{l=0}^{N_u(k)-1} A_k^{(l)} \cdot c_i^{(l)}. \qquad \text{Eq. 20}$$

For each branch, the optimum value of $N_u(k)$ that maximizes the branch rate $C_k$ re-defined as the product of the number of bits $b_k$ by the number of used codes $N_u(k)$, has to be determined as a trade-off between the number of transmission codes (acting linearly on $C_k$) and the number of bits sent on each signature codes (decreasing for high value of $N_u(k)$). In other words, the number of bits (per code) loaded on each branch relates to the signal to noise ratio $SNR_k$ through Eq. 8: the higher $SNR_k$, the higher $b_k$. When ORC is performed in the FEQ, no residual MUI is experienced on the hard detector input, and Eq. 18 can be simplified in:

$$SNR_k^{(u)} = \frac{E_k^{(u)}}{\sigma_{N_k}^2} = \frac{|D_k|^2 \cdot E_s^{(u)}}{F_k \cdot \sigma_k^2} \qquad \text{Eq. 21}$$

Using $N_u(k) \leq G_p$ results in increased signal energy per transmitted code ($E_s^{(u)}=E_s/N_u$) with respect to full MC²-CDMA, which can be translated in a higher number of bits sent on each branch. Hence, $N_u(k)$ is just chosen as the argument maximizing the branch rate $N_u(k) \cdot b_k$:

$$N_u(k) = \arg \max\{N_u(k) \cdot b_k\} \qquad \text{Eq. 22}$$

This optimization was initially suggested by a simple observation: there is no possibility for medium-long wires to modulate roughly beyond the 200-th branch (depending on the system environment) when a full MC²-CDMA scheme is adopted. On the other hand, adopting $N_u<G_p$ increases the bit loading upper bound, but at the same time the overall channel rate is lowered (compare FIG. 12 and FIG. 13).

The procedure described by Eq. 22 can be implemented with a simple search algorithm. Starting from $N_u(k)=1$, $SNR_k^{(u)}$ is first evaluated according to Eq. 21. Then, exploiting Eq. 8, $b_k$ is derived. Finally, the product $C_k^1 \equiv N_u(k) \cdot b_k|_{N_u(k)=1}=b_k$ of Eq. 22 is calculated.

Next, the same steps are repeated with $N_u(k)=2$, and the product $C_k^2 \equiv N_u(k) \cdot b_k|_{N_u(k)=2}=2 \cdot b_k$ is calculated. This is done for any value of $N_u(k)$ up to $N_u(k)=G_p$.

Finally, by simple comparison, the value N* of $N_u(k)$ that maximizes $C_k^{N_u(k)}$ is derived.

The procedure described above is repeated for any branch k of the communication system.

Figure 14:
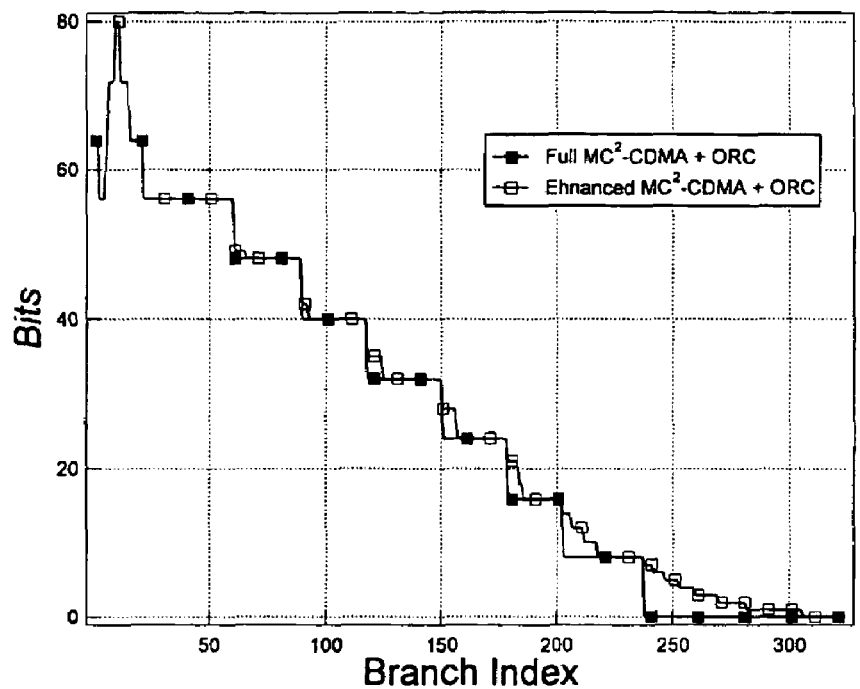
FIG. 14 is a Performance comparison between branch optimized approach and the original one with Nu=Gp=8 for the ORC receiver (ANSI TP2 1.1 Km-long wire, 15 FEXT interferers and Alien)

FIG. 14 shows the simulated bit-loading profile carried out with the enhanced, optimized transmission scheme, compared with the not-optimized full MC²-CDMA solution. The branch rate $N_u(k) \cdot b_k$ has been plotted here versus the branch index ranging into [1,P]. As foreseen above, the optimized approach extends the loading bound at about branch 300, resulting in a rate improvement of about 5%.

Figure 15:
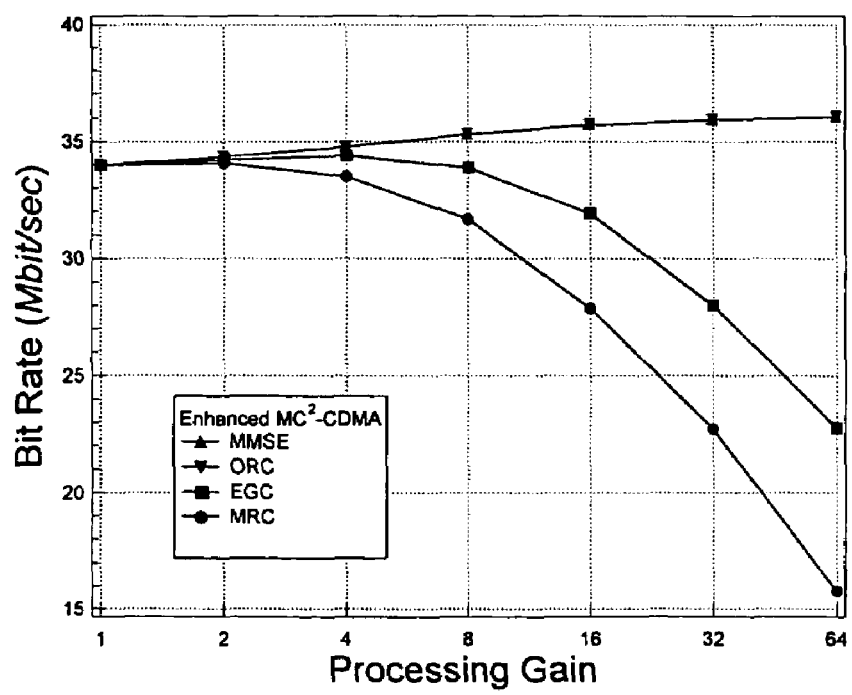
FIG. 15 is a Channel rate vs. processing gain diagram for enhanced $MC^2$ CDMA (1.1 Km-long ANSI TP2 wire, 15 FEXT interferers and Alien, not interlaced transmission)

FIG. 15 compares the channel rate of the enhanced MC²-CDMA scheme as a function of the spreading gain against the ones obtained with different detection techniques. The value $G_p=16$ represents the best trade-off between hardware complexity and performance improvement, since no remarkable advantages are achieved with higher value of the processing gain.

Figure 16A:
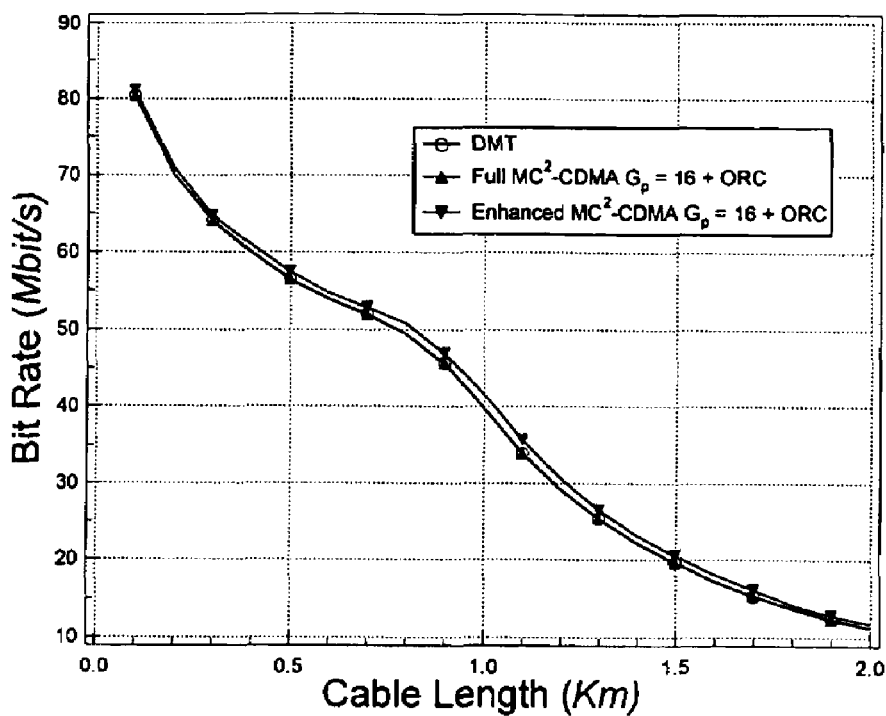
FIG. 16A is a Channel rate comparison diagram with 15 FEXT interferers.
Figure 16B:
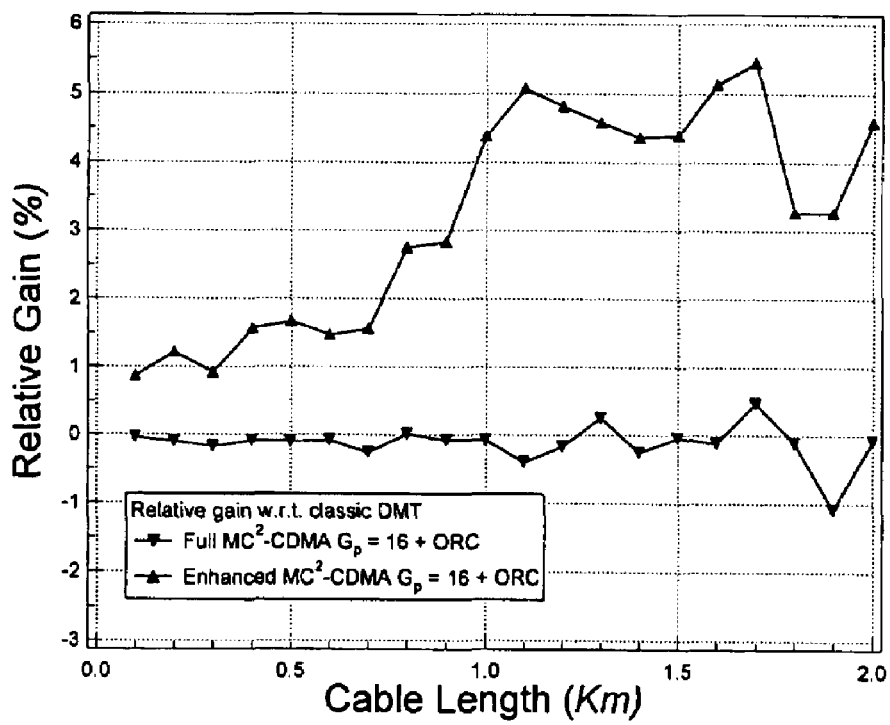
FIG. 16B is a channel rate relative gain diagram with 15 FEXT interferes.

FIG. 16A reports the channel rate for a standard DMT ($G_p=1$), the full MC²-CDMA modulation and the optimized one (both with $G_p=16$) in presence of Alien and 15 FEXT interferers. The optimized solution outperforms the others for any cable length, and the not-optimized MC²-CDMA scheme performs almost the same as the standard DMT As expected, the longer the cable length, the lower the channel rate. FIG. 16B provides the relative gain of both the enhanced algorithm and the full MC²-CDMA w.r.t the usual DMT scheme, in the same condition of FIG. 16A. An average gain of roughly 3% w.r.t the standard DMT modulation for the enhanced algorithm has been demonstrated. Moreover, the enhanced MC²-CDMA modulation gains up to 5% for medium-long wires w.r.t. DMT. Eventually, the not-optimized MC²-CDMA scheme is confirmed to perform almost the same as the classic DMT, and its average gain results almost zero.

Figure 17A:
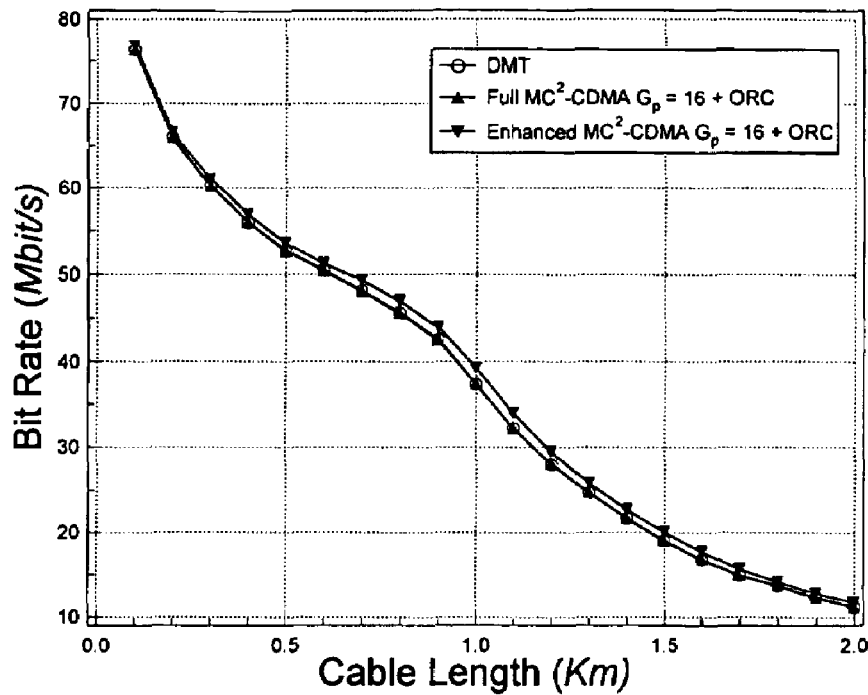
FIG. 17A is a channel rate comparison diagram with 25 FEXT interferers.
Figure 17B:
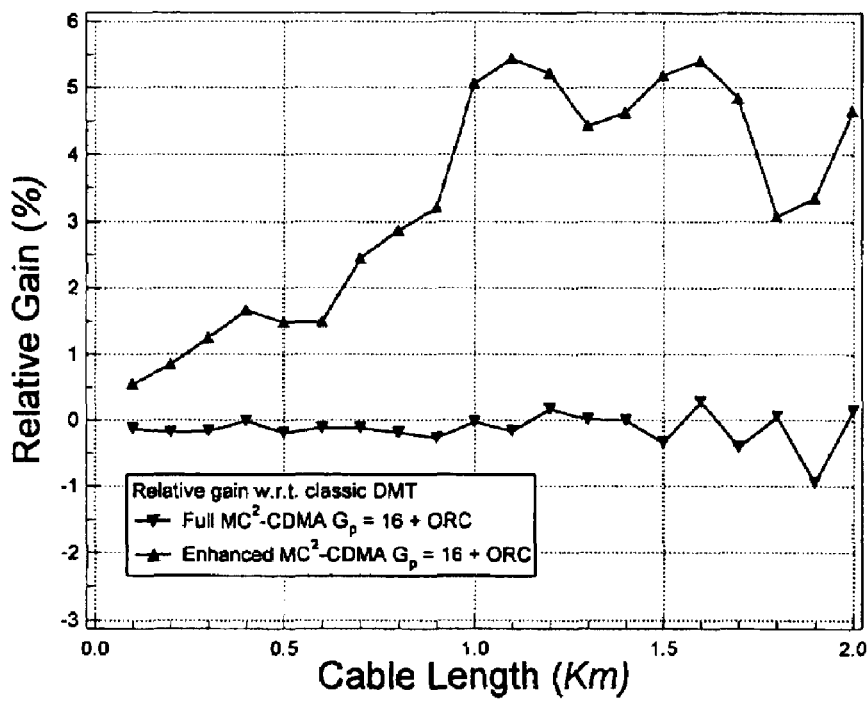
FIG. 17B is a channel rate relative gain diagram with 25 FEXT interferers.

FIGS. 17A and 17B compare the same modulation schemes as FIGS. 16A and 16B, but in presence of 25 FEXT interferers. Still, the enhanced MC²-CDMA modulation overall gains roughly 3% w.r.t standard DMT modulation and up to 5% for medium-long wires (longer than 1 Km).

Figure 18A:
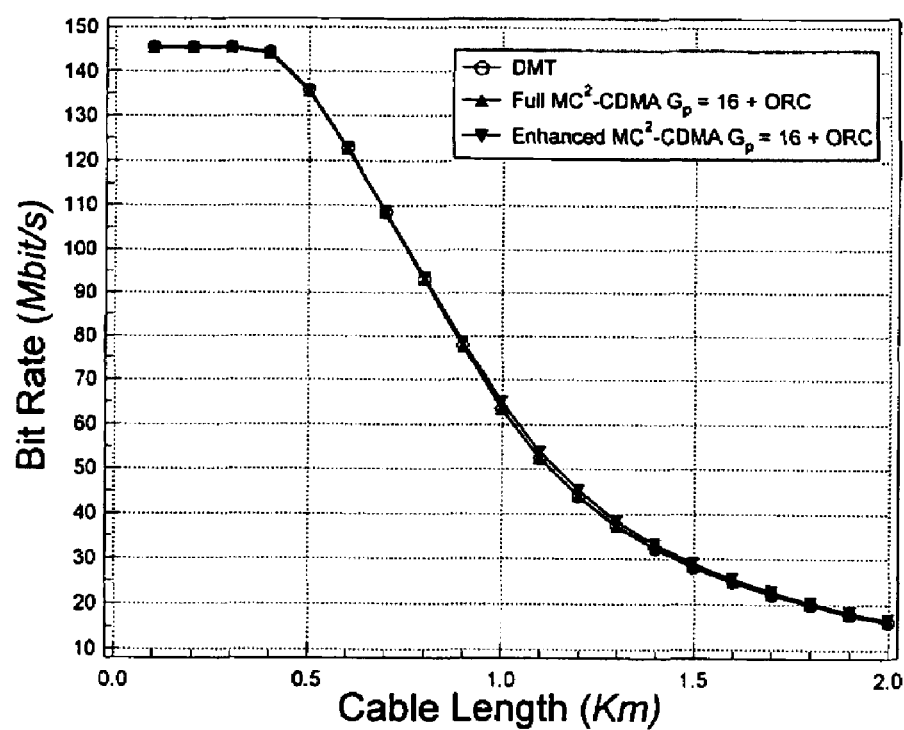
FIG. 18A is a channel rate comparison diagram without Alien nor FEXT interference.
Figure 18B:
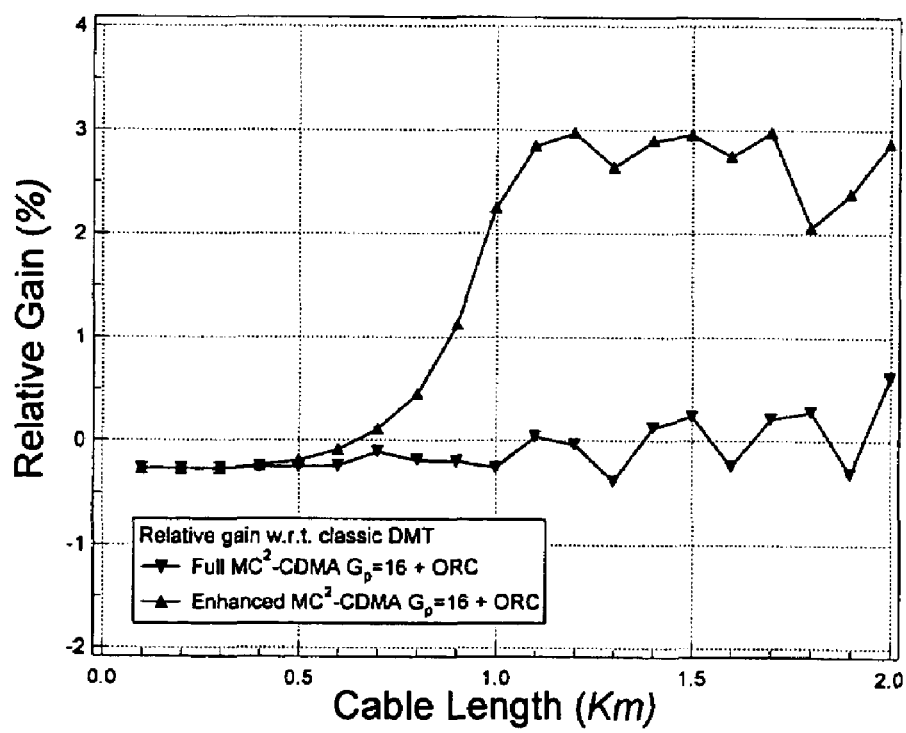
FIG. 18B Channel rate relative gain diagram without Alien nor FEXT interference.

Finally, FIGS. 18A and 18B show the simulated channel rate in absence of Alien and FEXT crosstalk (ideal no noisy transmission). As expected, the channel rate reaches higher value than before, but there is no clear gain between the two modulation techniques for short wires. Even if there is an average relative gain of about 3% for medium-long wires, the overall improvement is quite low, which means that the proposed optimized solution mainly suits in noisy environment with lots of cross-talkers. The upper bound of the channel rate for short wires is due to the considered QAM order limitation (set to 14 through these simulations).

Figure 19A:
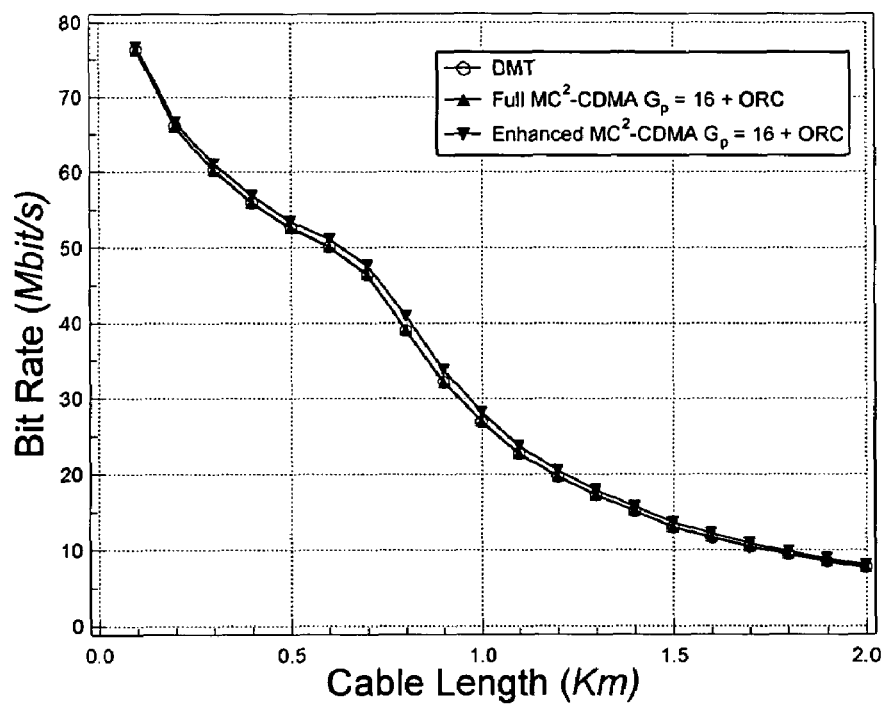
FIG. 19A is a channel rate comparison diagram with Alien and 25 FEXT interferers (type ANSI TP1 wire)
Figure 19B:
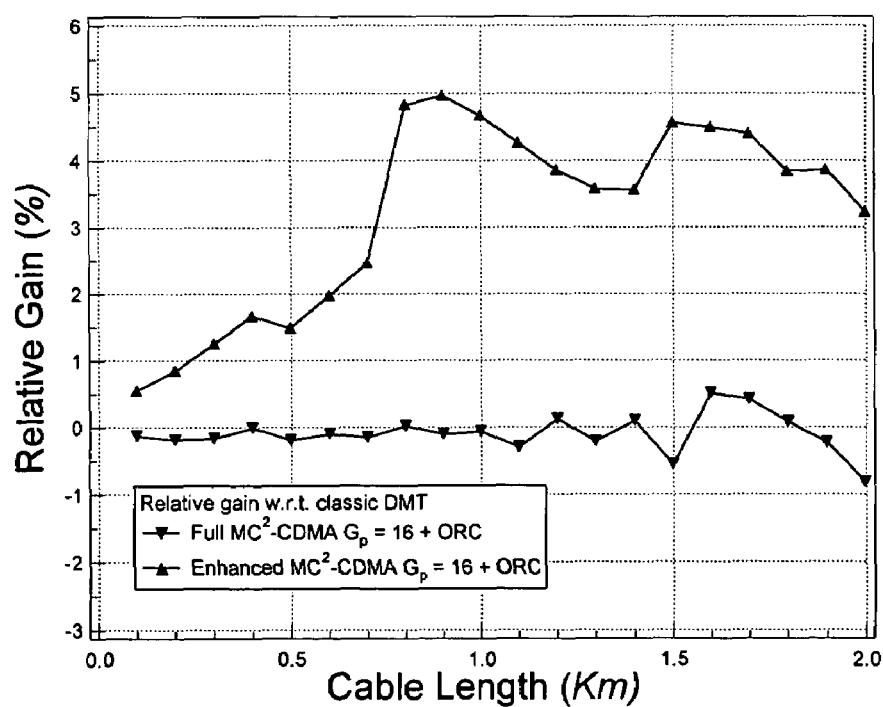
FIG. 19B is a channel rate relative gain diagram with Alien and 25 FEXT interferers (type ANSI TP1 wire).

For the sake of completeness, FIGS. 19A and 19B report the channel rate and the relevant gain in presence of Alien and 25 FEXT interferers, when an ANSI TP1 wire (0.4 mm, 26 AWG) is used. Again, an average gain of about 4% for medium-long wires is demonstrated.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

BIBLIOGRAPHY/REFERENCES

[1] F. Sjöberg, The zipper duplex method in very high-speed digital subscribers lines (Doctoral Thesis, Luleå University of Technology, Sweden, 2000).

[2] F. Sjöberg, High speed communication on twisted-pairs wire and low complexity multiuser detectors (Master thesis, Luleå University of Technology, Sweden, 1998).

[3] J. A. C. Bingham ADSL, VDSL and multicarrier modulation (Wiley Interscience publication, New York, 2000)

[4] S. Hara, R. Prasad, Overview of multicarrier CDMA, IEEE Communication Magazine, 1997, 126-133.

[5] R. Prasad, R. D. J. van Nee, OFDM for wireless multimedia communications (Artech. House, 2000).

[6] S. Hara, R. Prasad, Design and performance of multi-carrier CDMA system in frequency-selective raylaigh fading channels, IEEE Transaction on Vehicular Technology, 48(5), 1999, 1584-1595.

[7] D. Koulakiotis, A. H. Aghvami, Performance enhancement of multi-code CDMA using interference cancellation, Proc. 5th IEEE International Symposium on Spread Spectrum Techniques and Applications, 1, 1998, 130-134.

[8] J. M. Cioffi, A multicarrier primer, TE.4/91-157, November 1991.

[9] H. Sari, Review of multicarrier CDMA, Pacific Broadband Communications, Paris, France.

[10] J-Y. Baudais, J-F. Hélard, J. Citerne, Multi-carrier CDMA using interference cancellation, Institut National des Sciences Appliquées, INSA/LCST, France. http//per-so.libertysurf.fr/jean-yves.baudai/fichier/fich2.pdf.

[11] P. Zong, K. Wang and Y. Bar-Ness, Partial sampling MMSE interference suppression in asynchronous multi-carrier CDMA system, IEEE Journal on Selected Areas in Communication, 19(8), 2001, 1605-1613.

[12] A. C. MCCormick, P. M. Grant, J. S. Thompson, T. Arslan and A. T. Erdogan, A low power MMSE receiver architecture for multi-carrier CDMA, The 2001 IEEE International Symposium on Circuits and Systems, 4, Sydney Australia, 2001, 41-44.

[13] S. L. Miller, B. J. Rainbolt, MMSE detection of multi-carrier CDMA, IEEE Journal on Selected Areas in Communications, 18(11), 2000, 2356-2362.

[14] ETSI TS 101 270-1 V1.2.1 (1999-10), VDSL functional

What is claimed is:

1. VDSL transmission method, wherein said transmission is organized according to a plurality of parallel branches as a CDMA modulation, said CDMA modulation being effected for each branch on multiple carriers by spreading an original data stream for that branch over different subcarriers thus obtaining a Multi-Carrier CDMA modulation, wherein said Multi-Carrier CDMA modulation is effected using a plurality of different spreading codes in a frequency domain for each subcarrier, wherein transmitting and receiving by said method comprise the steps of:

transmitting:

inputting a binary source (b) data sequence to transmit;

converting or mapping said source data sequence into an alphabet of complex QAM symbols, said conversion being governed by a predetermined bit-loading table that sets a modulation order;

parallelizing the QAM symbols according to a plurality (p) of transmission branches (k) each having an own symbol stream ($A_k$), each transmission branch having a different QAM modulation order, each QAM modulation order being constant for each transmission branch;

further parallelizing each symbol stream into a plurality ($N_u$) of symbol sub-streams ($A_k^{(l)}$), spreading according to a plurality of sub-carrier frequencies each symbol sub-stream by means of CDMA codes obtaining transmission contributes ($T_{k,i}^{(l)}$) for each sub-carrier frequency;

for each branch carrying out an algebraic sum of said transmission contributes ($T_{k,i}^{(l)}$) obtaining a transmission sample ($T_{k,i}$) referred to that branch and to each subcarrier frequency;

associating each sample ($T_{k,i}$) coming from a branch to a respective transmission carrier frequency ($f_n$) according to a predetermined law; and carrying out a multiple carrier transmission based on a reverse Fourier transform (IFFT) of the samples thus associated; and receiving:

controlling the samples received with a processor that operates according to a direct Fourier transform (FET);

permuting said samples after the FFT according to a law inverse with respect to that used when transmitting;

despreading the samples with the same CDMA codes used in transmission to obtain an estimation of the number ($N_u$) of the transmitted complex symbols ($Z_k''$);

seriating the symbols ($Z_k''$) into a flow of symbols ($Z_k$) associated to each transmission branch (k);

further seriating the symbols ($Z_k$) into a flow (Z);

reverse converting or demapping; and estimating the transmitted bits (b).

2. VDSL transmission method according to claim 1, wherein said plurality ($N_u$) of symbol sub-streams ($A_k^{(l)}$) is variable in number according to a predetermined law.

3. VDSL transmission method according to claim 1, wherein said CDMA codes are orthogonal signature codes (Walsh-Hadamard).

4. VDSL transmission method according to claim 1, wherein said association of each sample ($T_{k,i}$) coming from a branch to a respective transmission carrier frequency ($f_n$) is carried out in an interlaced manner.

5. VDSL transmission method according to claim 1, wherein said association of each sample ($T_{k,i}$) coming from a branch to a respective transmission carrier frequency ($f_n$) is carried out as a consecutive, not interlaced, transmission.

6. VDSL transmission method according to claim 1, wherein for each transmission branch a frequential equalization is provided according to a determined channel frequency response, compensating distortions in said channel.

7. VDSL transmission method according to claim 6, wherein said frequential equalization is carried out according to a technique selected from the group consisting of: Orthogonal Restoring Combining (ORC), Maximum Ratio Combining (MRC), Equal Gain Combining (EGC) and Minimum Mean Square Error (MMSE).

* * * * *